United States Patent [19]
Kersey et al.

[11] Patent Number: 5,361,130
[45] Date of Patent: Nov. 1, 1994

[54] FIBER GRATING-BASED SENSING SYSTEM WITH INTERFEROMETRIC WAVELENGTH-SHIFT DETECTION

[75] Inventors: Alan D. Kersey, Fairfax Station; Timothy A. Berkoff, Alexandria, both of Va.

[73] Assignee: The United States of America as represented by the Secretary of the Navy, Washington, D.C.

[21] Appl. No.: 971,117

[22] Filed: Nov. 4, 1992

[51] Int. Cl.⁵ ............................................. G01B 9/02
[52] U.S. Cl. ................................. 356/345; 250/227.27
[58] Field of Search .................. 356/345; 250/227.19, 250/227.27; 385/12, 14, 28; 350/96.14, 96.4

[56] References Cited

U.S. PATENT DOCUMENTS

| | | | |
|---|---|---|---|
| 4,868,381 | 9/1989 | Davis | 356/345 |
| 4,889,986 | 12/1989 | Kersey | 250/227 |
| 4,897,543 | 1/1990 | Kersey | 250/227 |
| 4,968,110 | 11/1990 | Bulmer et al. | 350/96.14 |
| 5,115,127 | 5/1992 | Bobb et al. | 250/227.19 |
| 5,140,154 | 8/1992 | Yurek et al. | 250/227.12 |

OTHER PUBLICATIONS

W. W. Morey, "Distributed Fiber Grating Sensors," Proc. OFS, 90, pp. 285-288, Sydney, Australia, Dec. 1990.

A. D. Kersey et al., "High Resolution Fibre Grating Based Strain Sensor with Interferometric Wavelength Shift Detection," Elect. Letters, 30 Jan. 1992, vol. 28, No. 3, p. 236.

A. Dandridge et al., "Homodyne Demodulation Scheme for Fiber Optic Sensors Using Phase Generated Carrier," IEEE J. Quantum Electron., QE-18, p. 1647, 1982.

R. M. Measures, et al., "Wavelength Demodulated Bragg Grating Fiber Optic Sensing Systems for Addressing Smart Structure Critical Issues," Smart Mater. Struct. 1 (1992) 36-44.

W. W. Morey et al., "Multiplexing Fiber Bragg Grating Sensors," Proc. 'Distributed and Multiplexed Fiber Optic Sensors,' SPIE vol. 1586, paper #22, Boston, Sep., 1991.

Primary Examiner—Samuel A. Turner
Assistant Examiner—Russell C. Wolfe
Attorney, Agent, or Firm—Thomas E. McDonnell; Daniel Kalish

[57] ABSTRACT

A system for sensing a measurand field, the system comprising a source of broadband light, a sensor, an unbalanced optical interferometric apparatus, and a signal processor. The sensor produces an optical return signal having a wavelength functionally dependent on the measurand field. The interferometric apparatus produces an electrical interference output signal having a phase shift functionally dependent on the wavelength of the return signal, and the processor develops a processing signal indicative of the measurand field value.

26 Claims, 7 Drawing Sheets

FIG. 8

FIBER GRATING-BASED SENSING SYSTEM WITH INTERFEROMETRIC WAVELENGTH-SHIFT DETECTION

FIELD OF THE INVENTION

The present invention relates to sensors, and more particularly, to optical systems for sensing changes in environmental conditions or physical phenomena.

BACKGROUND OF THE INVENTION

Figure 1:
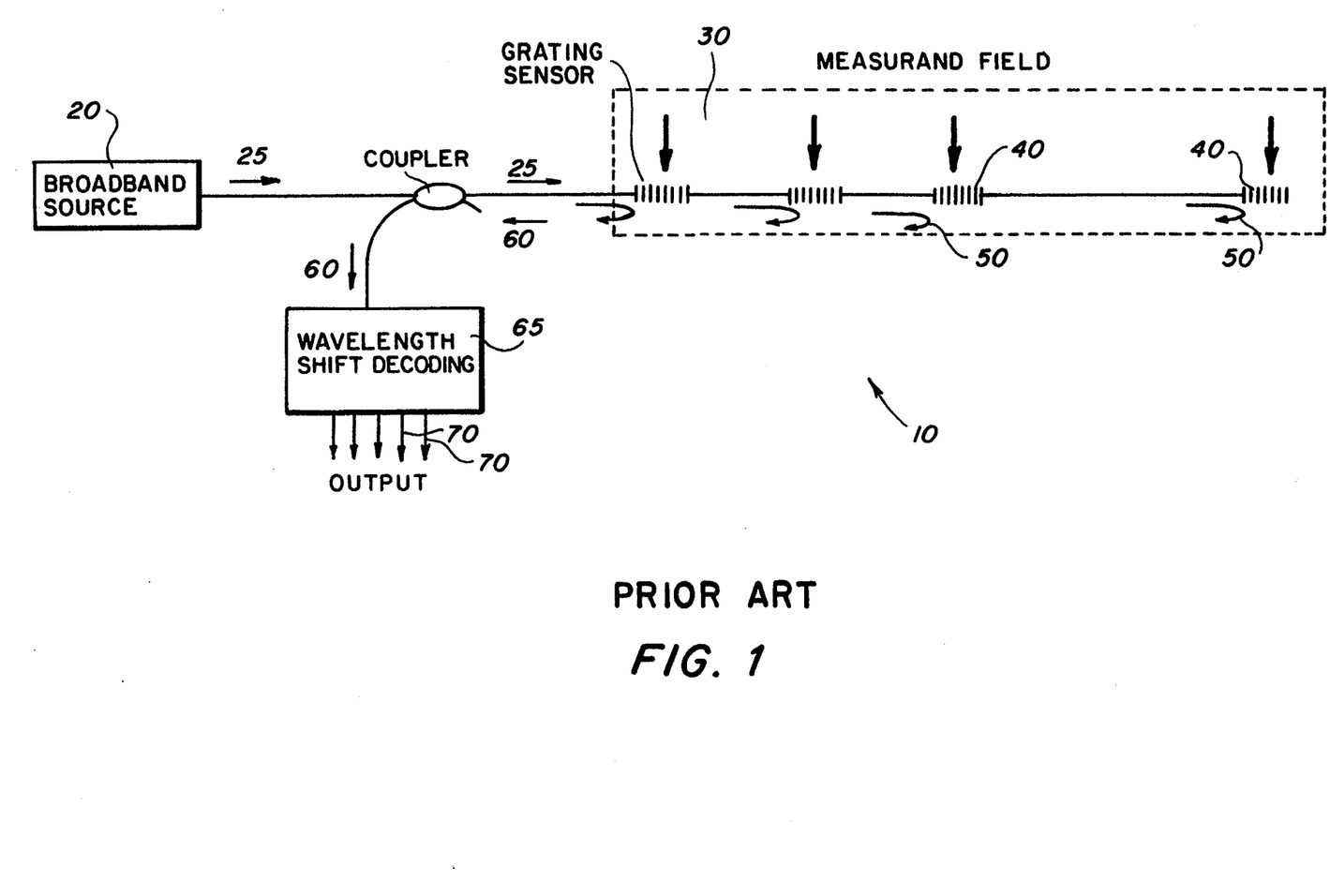
FIG. 1 is a schematic block diagram of an optical sensing system according to prior art.

As shown in FIG. 1, a typical fiber grating-based strain sensing system 10 for sensing a measurand field according to the prior art comprises an optical source 20 for providing broadband light 25 to an array 30 of serially coupled sensor elements 40. Each sensor element 40 returns an optical signal 50 having a narrow-band wavelength component, the wavelength depending by a known functional relation on the measurand field being sensed. The measurand field is a particular environmental condition or physical phenomenon under consideration. In other words, perturbation of that condition or phenomenon at element 40 results in a change of the wavelength of optical signal 50. The array 30 combines the individual signals, such as by wavelength-division or time-division multiplexing, to produce a composite return signal 60 having a plurality of components, each uniquely corresponding to a signal 50 from an individual sensor element 40.

The return optical signal 60 is decoded by decoding device 65 to provide signals 70, each of which corresponds to a signal 50 from a selected element 40 and is indicative of the measurand field value at that selected element 40. Signals 70 are processed by signal processing circuits (not shown) to identify the wavelength shift and produce output signals indicative of the measurand field values at elements 40. This processing typically utilizes a bulk-optical spectrometer, monochromator, or dispersive element coupled with an image array, such as a CCD detector array.

These systems according to prior art are unattractive due to the nature of a bulk-optical apparatus, its size, and its lack of ruggedness. Furthermore, conventional optical sensing systems provide low resolution and accuracy since the resolution of even the best spectrometer is about 0.1 nanometer (nm) or less, which is typically on the same order of magnitude as the optical bandwidth of the sensor elements.

SUMMARY OF THE INVENTION

It is an object of the present invention to provide a high resolution optical system for sensing changes in environmental conditions or physical phenomena.

Another object of the present invention to provide a compact, robust optical system for sensing changes in environmental conditions or physical phenomena.

A further object of the present invention to provide a high resolution optical system for sensing changes in environmental conditions or physical phenomena at distinct locations.

These and other objectives are achieved by a system for sensing a measurand field, the system comprising a source of broadband light, a sensor, an unbalanced optical interferometric apparatus, and a signal processor. The sensor produces an optical return signal having a wavelength functionally dependent on the measurand field. The interferometric apparatus produces an electrical interference output signal having a phase shift functionally dependent on the wavelength of the return signal, and the processor develops a processing signal indicative of the measurand field value.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE PREFERRED EMBODIMENT

Figure 2:
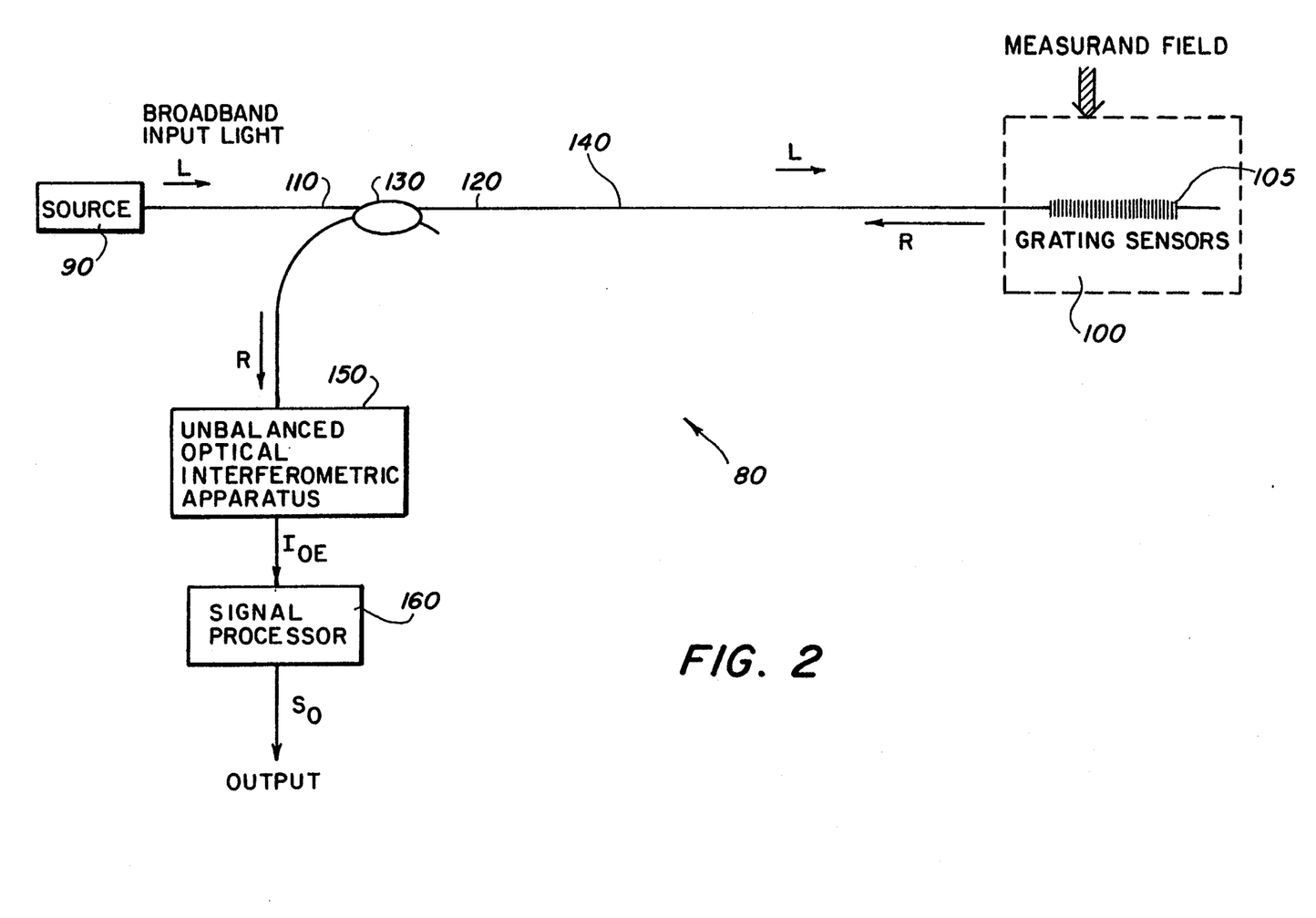
FIG. 2 is a schematic block diagram of a preferred embodiment of the present invention.

Referring now to FIG. 2, a schematic block diagram of a preferred embodiment of the invention is shown. More specifically, FIG. 2 shows a system 80 for sensing a measurand field.

A source 90 provides broadband light L to a sensor 100. In response to the light L, the sensor 100 senses a measurand field of environmental conditions or physical phenomena, such as strain, temperature, pressure, electric fields, magnetic fields, electromagnetic fields, or acoustical waves, to produce an optical return signal R having a wavelength $\lambda$ functionally dependent on the value of the measurand field at the sensor 100.

Source 90 produces light L having a spectrum at least as broad as the expected range of wavelengths in signal R. Source 90 is preferably an edge-emitting LED, a super-luminescent diode, or a superfluorescent fiber. An example of a superfluorescent fiber is a diode-pumped erbium-doped superfluorescent fiber with an optical spectrum of from 1530 to 1565 nm. Although not absolutely required for the practice of this invention, the light L is transmitted from the source 90 to the sensor 100 by way of ports 110 and 120 of a fiber optic coupler 130, and from port 120 to the sensor 100 by way of a single-mode optical fiber 140. The signal R is transmitted from sensor 100 to port 120 by way of optical fiber 140.

Although not absolutely required for the practice of this invention, an isolator (not shown) is inserted between port 110 and source 90 in order to reduce feedback to the source 90. Such an isolator would be desirable for use with an unstable source 90, such as an erbium-doped fiber, which, upon operation of the invention, might otherwise begin to lase and become narrowband.

Figure 7:
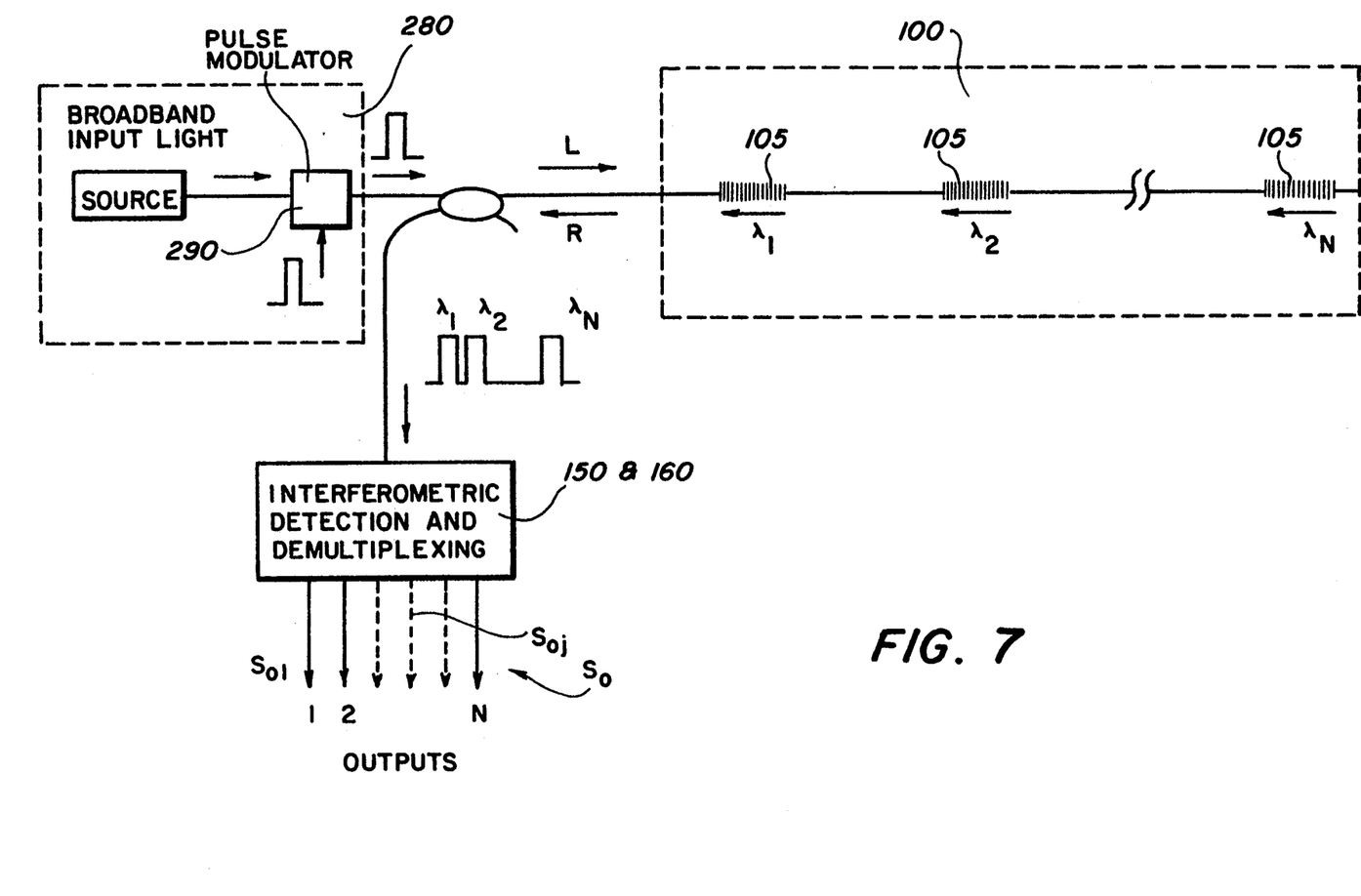
FIG. 7 is a schematic block diagram of a time-multiplexed system for sensing a measurand field at a plurality of locations.

Referring briefly to FIG. 7, sensor 100 includes at least one sensor element 105. Although FIG. 2 contains one sensor element 105, it should be understood that the invention may be practiced by utilizing a sensor 100 having a plurality of sensor elements 105. The sensor element 105 is most preferably a grating sensor, such as a fiber Bragg grating, fabricated by irradiating with a 240 nm interference pattern an optical fiber having a germanium doped core. Such a grating sensor 105 produces a return signal R with an optical bandwidth ("w") about a Bragg wavelength $\lambda$.

The bandwidth w of signal R can have any value as determined by the physical characteristics of the sensor element 105. For example, the bandwidth w for a signal with Bragg wavelength $\lambda = 1.5$ $\mu$m is typically on the order of 0.1 nm. The actual Bragg wavelength $\lambda$ of signal R depends in a known manner on the measurand field value, and uniquely identifies it.

An example of such a sensor 100 is a sensor 100 designed to measure temperature, which sensor 100 produces a signal R having a wavelength directly proportional to the temperature according to a dependence defined by the fractional wavelength shift with respect to temperature T, $$\frac{\Delta \lambda}{\lambda} = \left[ \frac{1}{\lambda} \frac{d\lambda}{dT} \right] \cdot \Delta T. \tag{1}$$

For silica optical fiber, the above bracketed ratio has the numerical value of about 9. *$10^{-6}$/°C. Another example is a sensor 100 designed to measure strain, which will produce a signal R with a wavelength linearly dependent on the strain according to a dependence defined by the fractional wavelength shift with respect to strain ($\epsilon$), $$\frac{\Delta \lambda}{\lambda} - = \left[ \frac{1}{\lambda} \frac{d\lambda}{d\epsilon} \right] \cdot \Delta \epsilon. \tag{2}$$

For silica optical fiber, the above bracketed ratio has the numerical value of about 0.74 * $10^{-6}$/microstrain, where a microstrain is strain ($\Delta L/L$) of 1 part in $10^6$.

It should be understood this invention can be practiced by utilizing any kind of sensor 100 which produces a signal R having Bragg wavelength $\lambda$ dependent on the measurand field value at the location of sensor 100, if the Bragg wavelength $\lambda$ uniquely identifies the measurand field value. Although fiber grating-based sensors have been described above, other types of sensors, such as bulk-optical sensors, could be equally effective.

Return optical signal R is transmitted to an unbalanced optical interferometric apparatus 150, preferably by way of fiber coupler 130. The apparatus 150 produces an electrical interference output signal $I_{OE}$ which has a phase shift functionally dependent on and uniquely identifying the Bragg wavelength $\lambda$ of return optical signal R. In other words, the interferometric apparatus 150 converts wavelength shift in the return signal R to phase shift in signal $I_{OE}$.

A signal processor 160 develops a processing output signal $S_0$ functionally dependent on and uniquely identifying the phase of signal $I_{OE}$, which signal $S_0$ is indicative of the measurand field value. Since signal $I_{OE}$ uniquely identifies the wavelength shift in return signal R, and return signal R uniquely identifies the measurand field at sensor 100, therefore signal $S_0$ uniquely identifies the measurand field at sensor 100.

Figure 3:
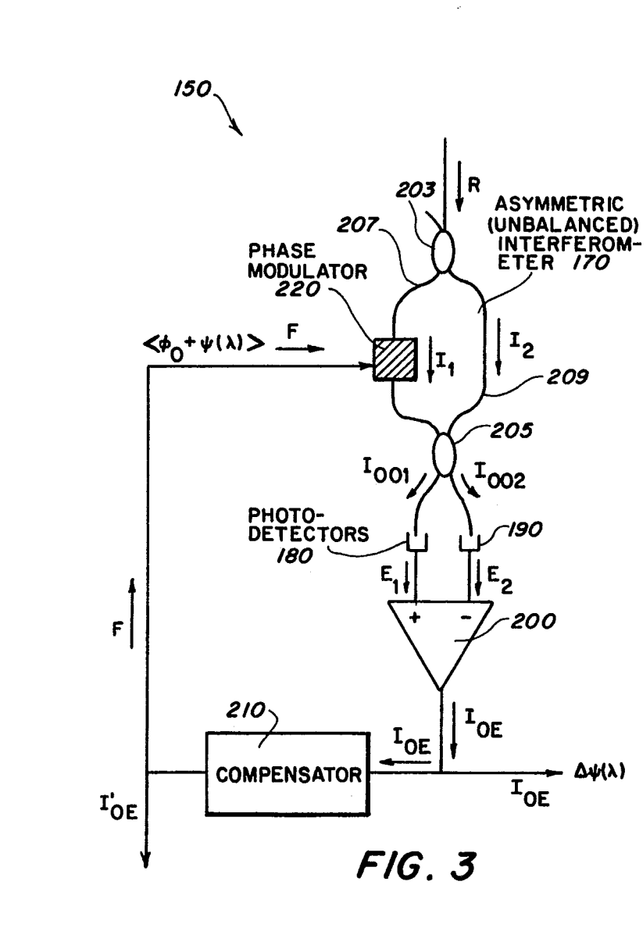
FIG. 3 is a schematic diagram of the optical interferometric apparatus 150 of FIG. 2.
Figure 4:
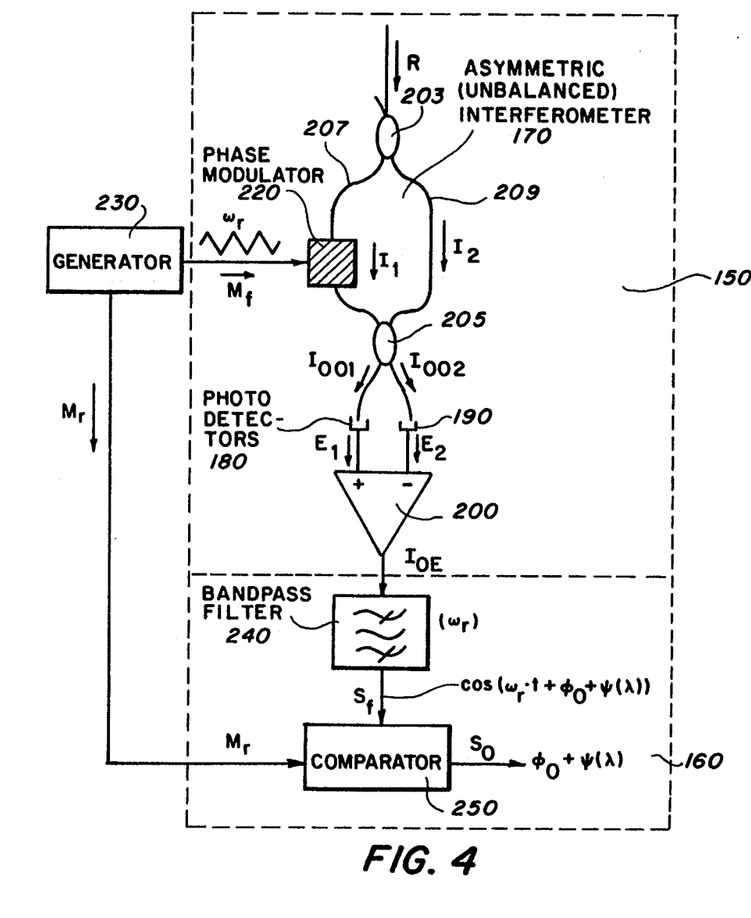
FIG. 4 illustrates the optical interferometric apparatus 150 and the signal processor 160 of FIG. 2.
Figure 5:
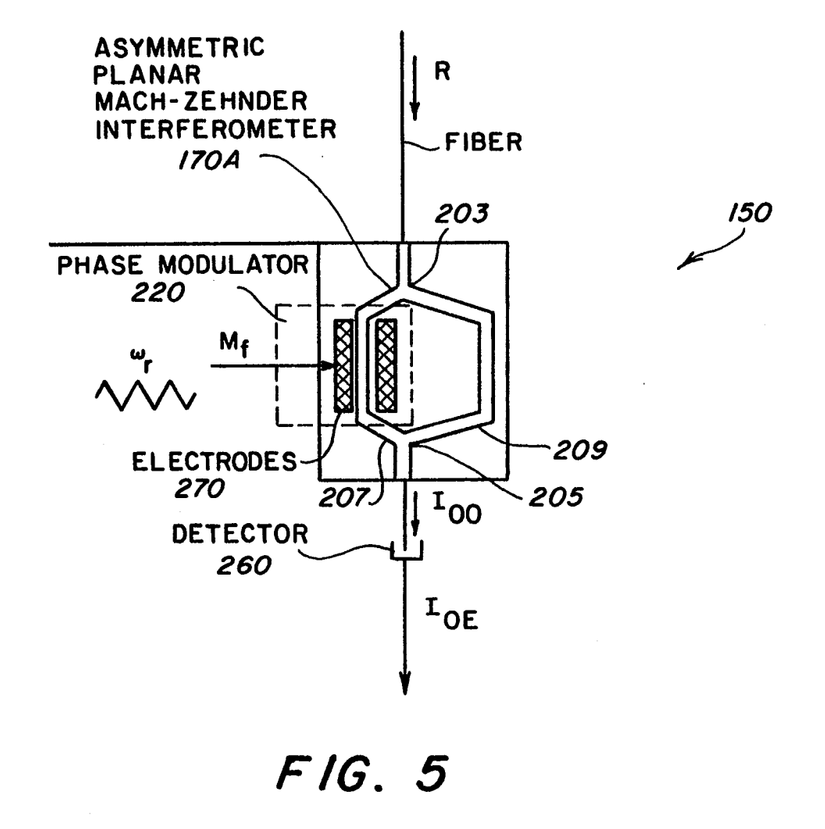
FIG. 5 illustrates the optical interferometric apparatus 150 of FIG. 2 based on a planar integrated-optic waveguide device.

Referring now to FIGS. 3, 4 and 5, the interferometric apparatus 150 includes an asymmetric (unbalanced) interferometer 170 (170A in FIG. 5), such as a Mach-Zehnder, Michelson, or low reflection Fabry-Perot interferometer. For purposes of this explanation, the asymmetric interferometer 170 or 170A will be an unbalanced Mach-Zehnder interferometer. The interferometer 170 or 170A includes two arms 207 and 209 having different optical path lengths—it does not matter which arm has longer optical path length. The optical path difference of the interferometer 170 or 170A is the physical path difference ("d") between the two arms 207 and 209 multiplied by the refractive index ("n") of the arms 207 and 209. The optical path difference must be less than the effective coherence length of return signal R, which is typically about 1 centimeter (cm) for a grating signal with bandwidth w=0.1 nm.

As shown in FIGS. 3 and 4, the interferometer 170 or 170A includes a 3 db input coupler 203 for coupling the optical return signal R to interferometer 170. Referring back to FIGS. 3, 4 and 5, the interferometer 170 or 170A generates first and second intermediate optical interferometric signals $I_1$ and $I_2$ in arms 207 and 209, respectively, signals $I_1$ and $I_2$ each being generated from and responsive to return signal R. Signals $I_1$ and $I_2$, after passing through arms 207 and 209, respectively, are combined and mixed by an output coupling device 205, such as a fiber optic coupler and a waveguide Y-junction, to produce optical output signal $I_O$ (shown as signals $I_{OO1}$ and $I_{OO2}$ in FIGS. 3 and 4 and shown as signal $I_{OO}$ in FIG. 5). Signal $I_O$ is a cosinusoidal signal having a phase dependent on the phase difference between the first and second signals $I_1$ and $I_2$ in arms 207 and 209, respectively, at output coupler 205.

For an interferometer so driven by return optical signal R with Bragg wavelength $\lambda$, the phase difference between the signals $I_1$ and $I_2$ in the arms 207 and 209, respectively, of the interferometer 170 or 170A, is given by the expression $$\Psi(\lambda) = \frac{2\pi n d}{\lambda}. \tag{3}$$

Optical output signal $I_0$ can be expressed as $I_0 = A \cdot \cos(\Psi(\lambda) + \phi_0)$, where A is an amplitude constant and $\phi_0$ is an interferometer phase bias, which may vary in time.

For a return optical signal R of nominal wavelength $\lambda_0$, $\Psi_0 = \Psi(\lambda_0)$. A measurand-induced change in the wavelength ($\Delta\lambda = \lambda - \lambda_0$) in the return signal generates a shift in the interferometer phase difference of $$\Delta\Psi(\lambda) = \Psi(\lambda) - \Psi(\lambda_0) = -\frac{2\pi n d}{\lambda_0^2} \cdot \Delta\lambda, \tag{4}$$

for $\Delta\lambda << \lambda_0$. Consequently, measurement of $\Delta\Psi$, the shift in the phase difference between signals $I_1$ and $I_2$ in interferometer arms 207 and 209, provides a means to determine the shift in the wavelength of the return signal R and thus the value of the measurand field at the location of sensor 100.

A number of approaches to determining or "reading" the phase shift of an interferometer have been developed, and are well known to persons of ordinary skill in the art. The following describes several basic approaches to this phase reading signal processing, but it is understood that any approach known to persons of ordinary skill in the art could be just as readily utilized. In all these approaches, the interferometric apparatus 150 produces the electrical interference output signal $I_{OE}$ which has a phase shift functionally dependent on and uniquely identifying the Bragg wavelength $\lambda$ of return optical signal R, and the signal processor 160 develops a processing output signal $S_0$ functionally dependent on and uniquely identifying the phase of signal $I_{OE}$.

As shown in FIGS. 3 and 4, the electrical interference output signal $I_{OE}$ is produced by balanced detection. Referring now to FIGS. 3 and 4, the interferometer 170 produces first and second cosinusoidal optical interference output signals $I_{OO1}$ and $I_{OO2}$ by optically mixing the intermediate signals $I_1$ and $I_2$ in a 3 db output coupler 205. First and second photodetectors 180 and 190, respectively, convert first and second optical signals $I_{OO1}$ and $I_{OO2}$ to first and second electrical interference signals $E_1$ and $E_2$, respectively. Difference amplifier 200, in response to signals $E_1$ and $E_2$, produces signal $I_{OE}$. Signal $I_{OE}$ so produced is of the form $I_{OE} = B \cdot \cos(\Psi(\lambda) + \phi_0)$, where A is an amplitude constant. This signal $I_{OE}$ has a phase shift functionally dependent on and uniquely identifying the Bragg wavelength $\lambda$ of return signal R. Since its amplitude is indicative of the phase shift $\Delta\lambda$, it could be readily processed by a signal processor 160 using means known to persons of ordinary skill in the art to produce the output signal $S_0$ which uniquely identifies the measurand field value at sensor 100.

Although not absolutely required for the practice of this invention, interferometer 170 includes a phase modulator 220 responsive to a modulation signal $S_M$ (signal F in FIG. 3, signal $M_f$ in FIGS. 4 and 5) for modulating the phase of signal $I_1$ in arm 207. Phase modulator 220 could modulate signal $I_1$ mechanically, such as by piezoelectric stretching, or it could modulate signal $I_1$ electro-optically or otherwise.

Referring now to FIG. 3, an exemplary interferometric apparatus 150 is shown. A compensator 210, responsive to signal $I_{OE}$, produces a feedback compensation signal F and provides it to the phase modulator 220. The phase modulator 220 is responsive to feedback signal F for modulating the first intermediate optical signal $I_1$. Compensator 210 and phase modulator 220 collectively constitute a feedback mechanism responsive to the electrical interference output signal $I_{OE}$ for modulating the first intermediate signal $I_1$. Operation of this feedback mechanism locks the interferometer 170 at a single phase point, also known as the quadrature point. The interferometric apparatus 150, shown in FIG. 3, contains such a feedback mechanism to provide a high signal to noise ratio and wide dynamic range.

The feedback mechanism comprising compensator 210 and phase modulator 220 is characterized by a response time $\tau$. For time variations in Bragg wavelength $\lambda$ in return signal R (equivalently, variations in the measurand field at sensor 100) which are longer than response time $\tau$ (that is, slow, quasi-static variation), the interferometer 170 is held in quadrature by feedback signal F and signal $I_{OE}$ is constant. In this mode of operation, interferometer phase shifts induced by Bragg wavelength changes $\Delta\lambda$ are compensated for by an equal and opposite phase change produced by the phase modulator 220. The feedback signal F thus provides useful information and is utilized as output signal $I_{OE}'$ since its amplitude is proportional to $\Psi$ which, by equations (3) and (4), is a direct measure of the Bragg wavelength $\lambda$ and of any variation from the nominal wavelength $\lambda_0$. The feedback signal F ($I_{OE}'$) thus provides a measure of the Bragg wavelength shift $\Delta\lambda$ and thus measurand changes at the sensor 100 location.

For time variations in Bragg wavelength $\lambda$ which are shorter than $\tau$ (that is, rapid variation), the response time of the feedback mechanism will be too slow to respond to the dynamic phase changes, and the interferometric apparatus 150 will produce output signal $I_{OE}$ of the form $I_{OE} = C \cdot \sin(\Psi(\lambda))$, where C is an amplitude constant. This signal $I_{OE}$ is readily processed by means known to persons of ordinary skill in the art to produce an output signal $S_0$ which uniquely identifies the measurand field value at sensor 100.

Referring now to FIG. 4, an implementation of the interferometric apparatus 150 of FIG. 2 using serrodyne modulation is shown. It should be realized that other types of modulation, such as cosinusoidal modulation, could be utilized in FIG. 4. As shown in FIG. 4, a generator 230 produces a modulation ramp signal $M_f$ and reference signal $M_r$, each of essentially single modulation frequency $\omega_r$. The signal $M_f$ is a ramp function, also called a saw-toothed function. In response to the modulation signal $M_f$, the phase modulator 220 modulates the first intermediate optical signal $I_1$ with a phase amplitude of $2\pi$ radians peak to peak, and drives signals $I_{OO1}$ and $I_{OO2}$ over one complete interference cycle. Optical signal $I_2$ and optical signal $I_1$, as modulated by modulation signal $M_f$, are combined with each other in the output coupler 205 of interferometer 150, resulting in interferometer optical output signals $I_{OO1}$ and $I_{OO2}$. These combined signals $I_{OO1}$ and $I_{OO2}$ are respectively detected by photodetectors 180 and 190 to respectively produce electrical interference signals $E_1$ and $E_2$. These signals $E_1$ and $E_2$ are then combined in difference amplifier 200 to produce the interferometer output signal $I_{OE}$. Since the interferometer 170 produces cosinusoidal optical output signals $I_{OO1}$ and $I_{OO2}$, each having phase dependent on the phase difference between the first and second signals $I_1$ and $I_2$ in arms 207 and 209 respectively, and since that phase difference is the sum of $\Psi(\lambda)$, as expressed in equations (3) and (4), and the phase modulation $\omega_r t$ produced by the phase modulator 220, plus phase bias $\phi_0$, therefore signal $I_{Oe}$ is of the form $I_{OE} = D \cdot \cos(\omega_r t + \Psi(\lambda) + \phi_0)$, where D is an amplitude constant.

The signal processor 160 shown in FIG. 4 includes a bandpass filter 240 for producing a filtered signal $S_f$ having frequency components within a selected bandwidth of frequency $\omega_r$. Filtered signal $S_f$ can be expressed as having amplitude $S_f = E \cdot \cos(\omega_r t + \phi_0 + \Psi(\lambda))$, where E is an amplitude constant. Signal $I_{OE}$ thus has phase components $\omega_r t$, $\phi_0$, and $\Psi(\lambda)$, corresponding to the carrier signal at frequency $\omega_r$, the phase bias $\phi_0$ of the interferometer, and a phase shift term $\Psi$ dependent on the wavelength $\lambda$ of return signal R according to equations (3) and (4). Phase comparator 250 then compares filtered signal $S_f$ with the reference signal $M_r$ from generator 230 to produce processing output signal $S_0$ having phase shift $\phi_0 + \Psi(\lambda)$, which is indicative of the measurand field value.

Referring now to FIG. 5, an implementation of the interferometric apparatus 150 of FIG. 2 which uses single ended detection is shown. As with the implementation shown in FIGS. 3 and 4, the interferometer 170A shown in FIG. 5 generates first and second optical intermediate signals $I_1$ and $I_2$ (FIGS. 3 and 4), each responsive to return signal R. Interferometer 170A also produces an optical interference output signal $I_{OO}$ dependent on signals $I_1$ and $I_2$. Photodetector 260 converts optical signal $I_{OO}$ to electrical signal $I_{OE}$. As with the implementation shown in FIG. 4, the interferometric apparatus 150 shown in FIG. 5 has a phase modulator 220 responsive to a ramp function modulation signal $M_f$ of essentially single frequency $\omega_r$, for modulating signal $I_1$. When used with such a modulation signal $M_f$, the interferometric apparatus 150 shown in FIG. 5 produces output signal $I_{OE}$ of the form $S_f = F \cdot \cos(\omega_r t + \phi_0 \Psi(\lambda))$, where F is an amplitude constant.

The single-ended detection interferometric apparatus 150, as shown in FIG. 5, contains an asymmetric planar integrated optic Mach-Zehnder modulator 170A, using surface channel waveguides 203, 205, 207 and 209, and phase modulation electrodes 270 to electro-optically modulate signal $I_1$ (see FIGS. 3 and 4). Such an interferometer 170A provides extremely stable phase shift $\phi_0$, thus enhancing the phase stability of the system output signal $S_0$ and thus the resolution with respect to changes in the measurand field.

An application of the system shown in FIG. 5 would be for high resolution dynamic strain sensing. For such a system, the wavelength to phase shift transfer function relating a change in Bragg wavelength to a change in phase shift is $$\Delta \Psi = -\frac{2\pi n d}{\lambda_0^2} \cdot \Delta \lambda = -\frac{2\pi n d}{\lambda_0} \cdot \xi \cdot \Delta \epsilon, \quad (5)$$

where $\Delta \epsilon$ is the dynamic strain applied to the grating, $\lambda_0$ is the nominal return wavelength of the unperturbed sensor element 105, and $\xi$ is the normalized strain-to-wavelength responsivity of sensor element 105, that is, $$\xi = \frac{1}{\lambda_0} \cdot \frac{\delta \lambda}{\delta \epsilon}. \quad (6)$$

In order to obtain the highest sensitivity to dynamic strain, $\delta \Psi / \delta \epsilon$, it is desirable to increase the optical path imbalance d. However, increasing d reduces the visibility of the output interference signal $I_{OE}$, due to the effective coherence length of a grating sensor element 105 reflection R. As an example, a path imbalance d of 10 millimeters (mm), a refractive index of 1.46, a wavelength $\lambda$ of 1.55 $\mu$m and a normalized strain responsivity $\epsilon$ of 0.74/microstrain would yield a sensitivity $\delta \Psi / \delta \epsilon$ of 0.045 radians (rad)/microstrain. Interferometers, such as interferometers 170 (FIGS. 3 and 4) and 170A (FIG. 5), typically have high resolution dynamic phase shift detection capability of about $10^{-6}$ rad/$\sqrt{Hz}$. Such detection capability, combined with this strain sensitivity $\delta \Psi / \delta \epsilon$ of 0.045 radians (rad)/microstrain yields a dynamic strain resolution of about 20 pico-strain/$\sqrt{Hz}$.

Figure 6:
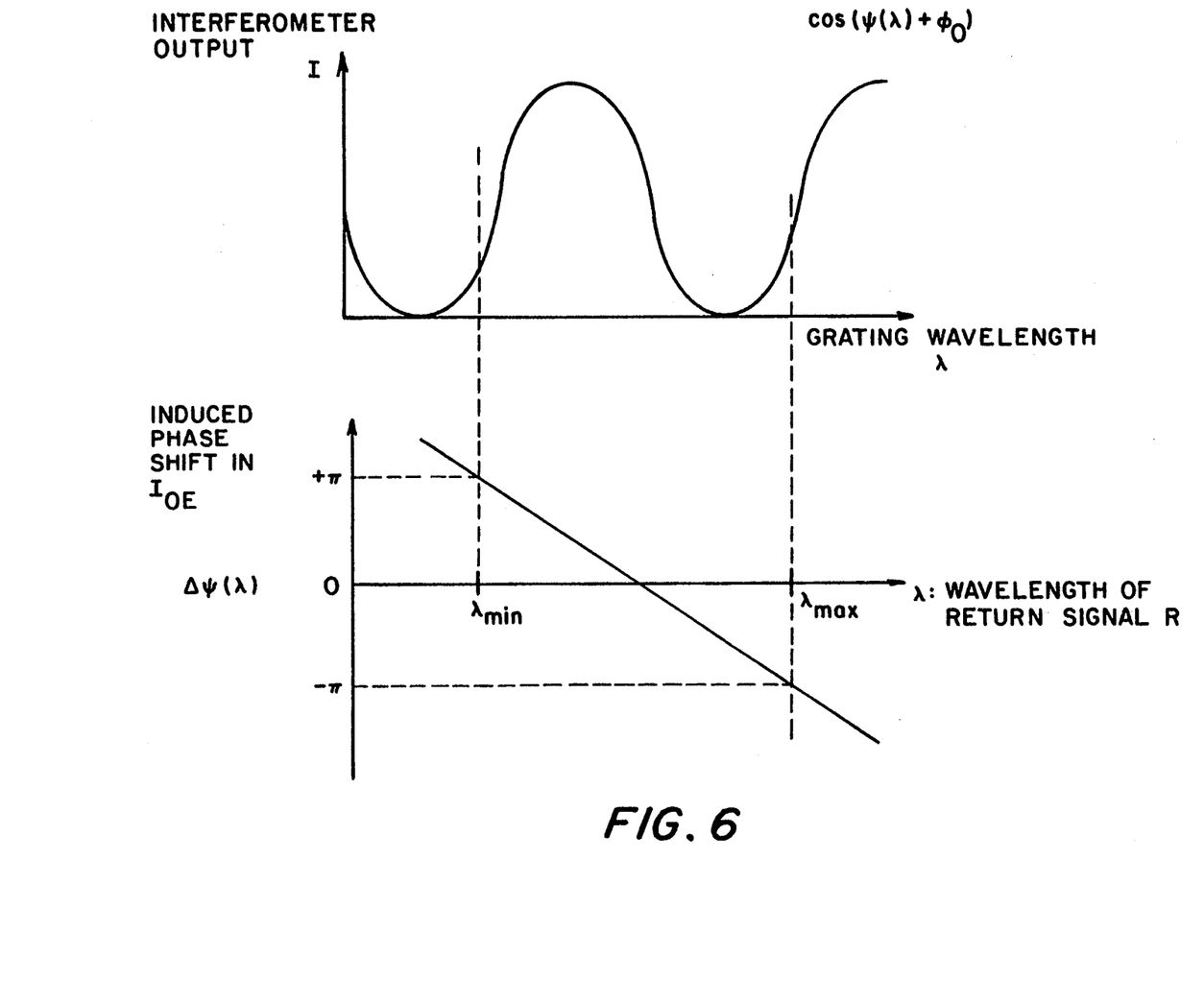
FIG. 6 shows the exemplary relationship produced by the interferometric apparatus 150 of FIG. 2 between the wavelength $\lambda$ of return signal R, and the induced phase shift $\Delta\Psi(\lambda)$ of electrical interference output signal $I_{OE}$.

Referring now to FIG. 6, the interferometric apparatus 150 (see FIG. 2) provides an electrical interference output signal $I_{OE}$ which uniquely identifies the wavelength of return signal R. As shown in FIG. 6, a transfer function $\Psi(\lambda)$ which attains a range differing by less than $2\pi$ radians over the domain of expected values of $\lambda$ provides such a feature. If the domain of expected values of the return signal wavelength $\lambda$ is represented as $\lambda_{min} < \lambda < \lambda_{max}$, and if the transfer function $\Psi(\lambda)$ is monotonically increasing, then $\Psi(\lambda)$ satisfies the inequality $0 < \Psi(\lambda_{max}) - \Psi(\lambda_{min}) < 2\pi$. Since the transfer function satisfies equation (1), therefore, the required optical path difference between the two interferometer arms 207 and 209 is $$nd < \frac{\lambda_0^2}{\lambda_{max} - \lambda_{min}}. \quad (7)$$

Since the phase shift in $I_{OE}$ always differs by less than one complete cycle ($2\pi$) over the expected domain of return signal R wavelengths, therefore the phase shift $\Psi$ in signal $I_{OE}$ uniquely identifies the wavelength shift $\lambda$. Since the wavelength shift $\lambda$ uniquely identifies the measurand field value, therefore this phase shift $\Psi$ shown in FIG. 6 uniquely identifies the measurand field value at sensor 100.

It should be understood that the unbalanced optical interferometric apparatus 150 of FIG. 2 need not have the precise configuration shown in FIGS. 3, 4, 5 or 6, so long as it produces an electrical interference output signal $I_{OE}$ which has a phase shift functionally dependent on the wavelength of return signal R. For example, a possible configuration of the invention would be one in which the light L from the source 90 is passed through an interferometer, such as interferometer 170A (FIG. 5). Optical output $I_{OO}$ from that interferometer 170A is passed to sensor 100, which produces return signal R'. Signal R' is then processed to develop an output signal $S_o'$ identifying the measurand field value at sensor 100.

It should also be understood that a variety of approaches to measuring the phase difference between optical signals $I_1$ and $I_2$ could be utilized equally effectively as the embodiments shown in FIGS. 3, 4 and 5. Examples include the use of synthetic heterodyning, a phase generated carrier based on derived sine and cosine dependent signals of the interferometer 170 phase difference, and passive techniques, such as using a 3×3 output coupler 205.

Figure 8:
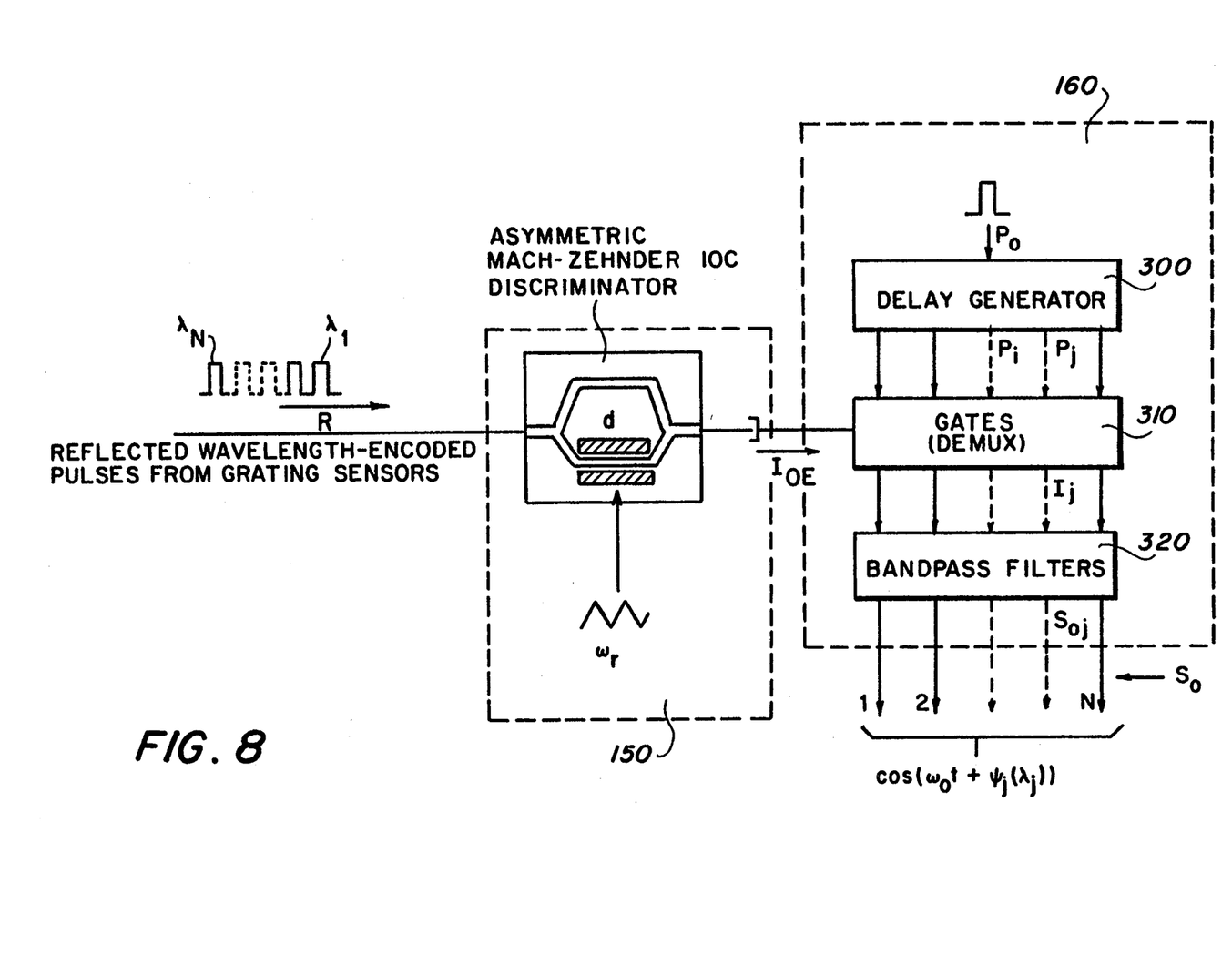
FIG. 8 illustrates the signal processor 160 of the time multiplexed system of FIG. 7.

The optical sensing system of the present invention may be used to sense a measurand field at a plurality of locations. Referring now to FIG. 7, sensor 100 includes a plurality of independently responsive sensing elements 105, and is thus a sensor array. Sensor array 100 produces a composite return signal R so that signal R has a plurality of components, each component uniquely corresponding to a particular sensing element 105 and having a wavelength functionally dependent on the measurand field value at that particular sensing element 105. For purposes of this explanation, sensor array 100, as shown in FIG. 7, is an in-line serial array 100 of sensor elements 105, although other configurations, such as a star-type arrangement, would be equally effective. Referring briefly to FIG. 8, signal processor 160, responsive to the electrical interference output signal $I_{OE}$, develops processing output signal $S_0$ so that signal $S_0$ is indicative of the measurand field value at a selected one of the plurality of sensing elements 105. It is understood by persons of ordinary skill in the art that there are other equivalent configurations readily developed for providing an optical system for sensing a measurand field at a plurality of locations.

FIG. 7 shows a time multiplexed configuration of the system of FIG. 2. A source 280 provides broadband pulsed light L to a sensor array 100, which is a serial array of a plurality of sensing elements 105. The j-th element 105 has nominal wavelength $\lambda_{j0}$. Although not absolutely required, the pulsed light L can be pulsed by operation of a pulse modulator 290. The temporal width of the pulsed light L provided by source 280 is less than the round trip time of light in sensor array 100 between adjacent sensor elements 105. For example, if the sensor elements are 2 meters (m) of optical distance apart, and the speed of light propagation in sensor array 100 is 2 meters in 10 nanoseconds (ns), then the round trip time between adjacent sensor elements 105 is 20 ns, and light L should have pulse width of less than 20 ns. The temporal spacing between consecutive pulses in light L (the inter-pulse period) is sufficient to allow all sensor elements 105 in sensor array 100 to contribute components to the return signal R. For example, in a sensor array 100 with 10 sensor elements 105 and 20 ns round trip spacing, the pulse repetition rate would be at least 500 kilohertz (kHz).

Sensor array 100 thus produces the return signal R which is a pulse train, each pulse in the pulse train uniquely corresponding to a particular sensing element 105.

The electrical interference output signal $I_{OE}$ is readily processed and time demultiplexed to provide a processing output signal $S_0$ having components $S_{0j}$ indicative of the measurand field at each j-th sensor element 105. Referring now to FIG. 8, an example of such a signal processor 160 has delay generators 300, demultiplexing gates 310, and band-pass filters 320 for producing multiple channels of output $S_{0j}$ each corresponding to a particular j-th sensor element 105. Specifically, for N sensor elements 105, the delay generators 300 responsive to a pulse signal $P_0$, produce N channels of delayed pulse signals $P_j$. Each pulse signal $P_j$ is in a different (j-th) channel, and for differing channels i and j, the pulse signals $P_i$ and $P_j$ start and end at different times, and do not overlap in time. The gates 310, responsive to the electrical interference output signal $I_{OE}$ and the N delayed pulse signals $P_j$ ($1 \leq j \leq N$), generates N channels of intermediate output signals $I_j$. Each signal $I_j$ is produced by performing the coincidence operator AND on signals $I_{OE}$ and delayed pulse signal $P_j$. The bandpass filters 320 produce N channels of processing output signals $S_{0j}$, each signal $S_{0j}$ having wavelength components within a selected bandwidth of the nominal wavelength $\lambda_{j0}$ for the j-th sensor element 105.

It is understood that a person of ordinary skill in the art may readily develop other equivalent multiplexing and demultiplexing configurations according to the present invention, for sensing a measurand field at a plurality of locations. For example, the sensor elements 105 could provide return signals with differing and unique wavelengths, and the source 90 could include multiple tunable laser sources, each locked to a specific sensor element 105. The multiplexing/demultiplexing processing would then involve frequency modulation.

It is understood that many other changes and additional modifications of the invention are possible in view of the teachings herein without departing from the scope of the invention as defined in the appended claims.

What is claimed is:

1. A system for sensing a measurand field, the system comprising:
   (a) source means for providing broadband light;
   (b) sensing means responsive to the broadband light for producing an optical return signal having a wavelength functionally dependent on the measurand field and having a coherence length;
   (c) unbalanced optical interferometric means responsive to the return signal for producing an electrical interference output signal having a phase shift functionally dependent on the wavelength of the return signal said interferometric means having optical path difference less than the coherence length of the return signal; and
   (d) processing means functionally dependent on the phase shift of the electrical interference output signal for developing a processing signal indicative of the measurand field value.

2. The system according to claim 1 further comprising a means for isolating said source means from the return signal.

3. The system of claim 2 further comprising:
   an optical fiber having a first position disposed apart from said sensing means, said optical fiber being coupled to said sensing means;
   a first means for transmitting the broadband light to said first position;
   a second means for transmitting the broadband light in said optical fiber from said first position to said sensing means;
   a third means for transmitting the return signal in said optical fiber from said sensing means to said first position; and
   a fiber coupling means for transmitting the return signal from said first position to said interferometric means.

4. The system according to claim 1 wherein said sensing means consists of a fiber optic sensor.

5. The system according to claim 4 wherein said sensing means further comprises a grating sensor.

6. The system of claim 1 wherein said interferometric means comprises:
   an interferometer for generating first and second intermediate interferometric signals each responsive to the return signal, said interferometer producing first and second optical interference signals each dependent on the first and second intermediate interferometric signals;
   first and second photodetection means for respectively converting the first and second optical interference signals to first and second electrical interference signals, respectively;
   a difference amplifier means responsive to the first and second electrical interference signals for producing the electrical interference output signal.

7. The system according to claim 6 wherein said interferometric means further comprises feedback means responsive to the electrical interference output signal for modulating the phase of the first intermediate interferometric signal.

8. The system of claim 6 wherein said interferometric means further comprises:
   means for generating a modulation signal; and
   means responsive to the modulation signal for modulating the phase of the first intermediate interferometric signal.

9. The system of claim 8 wherein said processing means further comprises:
   means responsive to the electrical interference output signal for producing a filtered signal having frequency components within a selected band-width of the frequency of the modulation signal; and
   comparison means responsive to the filtered signal and to the modulation signal for developing the processing signal.

10. The system of claim 1 wherein said interferometric means further comprises:

an interferometer for generating first and second intermediate interferometric signals each responsive to the return signal, said interferometric producing an optical interference signal dependent on the difference in phase between the first and second intermediate interferometric signals;

a photodetection means for converting the optical interference signal to an electrical interference output signal;

a means for generating a modulation signal; and a means responsive to the modulation signal for modulating the phase of the first intermediate interferometric signal.

11. The system according to claim 1 wherein said interferometric means comprises an unbalanced integrated optic modulator.

12. The system of claim 1 wherein:

said sensing means comprises a plurality of independently responsive sensing elements, said sensing means producing the return signal so that the return signal has a plurality of components, each component uniquely corresponding to one of said plurality of sensing elements and having wavelengths functionally dependent on the measurand field at said sensing element uniquely corresponding to said component; and said processing means further comprises means for developing the processing signal so that the output signal is indicative of the measurand field value at a selected one of said plurality of sensing elements.

13. The system according to claim 12 wherein said source means provides a pulse train of broadband light.

14. A method for sensing a measruand field, the method comprising:

(a) a source step of providing broadband light;

(b) a sensing step responsive to the broadband light, said sensing step comprising producing an optical return signal having a wavelength functionally dependent on the measurand field and having a coherence length;

(c) an unbalanced optical interferometric step responsive to the return signal, said interferometric step comprising using an interferometer having optical path difference less than the coherence length of the return signal for producing an electrical interference output signal having a phase shift functionally dependent on the wavelength of the return signal; and (d) a processing step functionally dependent on the phase shift of the electrical interference output signal, said processing step comprising developing a processing signal indicative of the measurand field value.

15. The method of claim 14 wherein:

said source step provides a pulse train of broadband light;

said sensing step further comprises producing the return signal so that the return signal has a plurality of components, each component uniquely corresponding to one of a plurality of sensing elements and being functionally dependent on the measurand field at said sensing element uniquely corresponding to said component; and said processing step further comprises developing the processing signal so that the output signal is indicative of the measurand field value at a selected one of said plurality of sensing elements.

16. The system of claim 13 wherein said sensing means of element (b) comprises means for producing a pulsed return signal, the pulses of the return signal being in one to one correspondence with the pulses of the broadband light.

17. The method of claim 15 wherein said sensing step (b) further comprises producing a pulsed return signal, the pulses of the return signal being in one to one correspondence with the pulses of the broadband light.

18. A system for sensing a measurand field, the system comprising:

(a) source means for providing broadband light;

(b) sensing means responsive to the broadband light for producing an optical return signal having a wavelength functionally dependent on the measurand field and having a coherence length, said sensing means consisting of a grating sensor;

(c) unbalanced optical interferometric means responsive to the return signal for producing an electrical interference output signal having a phase shift functionally dependent on the wavelength of the return signal, said interferometric means having optical path difference less than the coherence length of the return signal; and (d) processing means functionally dependent on the phase shift of the electrical interference output signal for developing a processing signal indicative of the measurand field value.

19. The system according to claim 18 further comprising a means for isolating said source means from the return signal.

20. The system of claim 19 further comprising:

an optical fiber having a first position disposed apart from said sensor means, said optical fiber being coupled to said sensing means;

first means for transmitting the broadband light to said first position;

second means for transmitting the broadband light in said optical fiber from said first position to said sensing means;

third means for transmitting the return signal in said optical fiber from said sensing means to said first position; and fiber coupling means for transmitting the return signal from said first position to said interferometric means.

21. The system of claim 18 wherein said interferometric means comprises:

an interferometer for generating first and second intermediate interferometric signals each responsive to the return signal, said interferometer producing first and second optical interference signals each dependent on the first and second intermediate interferometric signals;

first and second photodetection means for respectively converting the first and second optical interference signals to first and second electrical interference signals, respectively;

difference amplifier means responsive to the first and second electrical interference signals for producing the electrical interference output signal.

22. The system according to claim 21 wherein said interferometric means further comprises feedback means responsive to the electrical interference output signal for modulating the phase of the first intermediate interferometric signal.

23. The system of claim 21 wherein said interferometric means further comprises:

means for generating a modulation signal; and means responsive to the modulation signal for modulating the phase of the first intermediate interferometric signal.

24. The system of claim 23 wherein said processing means further comprises:

means responsive to the electrical interference output signal for producing a filtered signal having frequency components within a selected band-width of the frequency of the modulation signal; and comparison means responsive to the filtered signal and to the modulation signal for developing the processing signal.

25. The system of claim 18 wherein said interferometric means further comprises:

an interferometer for generating first and second intermediate interferometric signals each responsive to the return signal, said interferometer producing an optical interference signal dependent on the difference in phase between the first and second intermediate interferometric signals;

photodetection means for converting the optical interference signal to an electrical interference output signal;

means for generating a modulation signal; and means responsive to the modulation signal for modulating the phase of the first intermediate interferometric signal.

26. The system according to claim 18 wherein said interferometric means comprises an unbalanced integrated optic modulator.

* * * * *